United States Patent [19]

Younkin

[11] 3,792,427
[45] Feb. 12, 1974

[54] AIRCRAFT HORIZON DISPLAY AND STEERING INDICATOR

[75] Inventor: James R. Younkin, Mineral Wells, Tex.

[73] Assignee: Mitchell Industries, Inc., Mineral Wells, Tex.

[22] Filed: Sept. 3, 1971

[21] Appl. No.: 177,805

Related U.S. Application Data

[63] Continuation of Ser. No. 855,984, Sept. 8, 1969, abandoned.

[52] U.S. Cl. .............................. 340/27 NA, 33/329
[51] Int. Cl. .............................................. G01c 19/34
[58] Field of Search......... 340/27 R, 27 AT, 27 NA; 33/328, 329, 330; 74/5.46

[56] References Cited
UNITED STATES PATENTS

| | | | |
|---|---|---|---|
| 2,417,720 | 3/1947 | Wendt | 33/328 |
| 2,613,050 | 10/1952 | Esval | 340/27 NA |
| 3,654,597 | 4/1972 | Cox | 340/27 NA |
| 3,162,834 | 12/1964 | Schweighoffer et al. | 340/27 AT |
| 2,943,482 | 7/1960 | Fritze et al. | 340/27 AT |
| 2,415,707 | 2/1947 | Savage | 33/328 |
| 2,160,970 | 6/1939 | Koster | 33/328 |

*Primary Examiner*—Kathleen H. Claffy
*Assistant Examiner*—Randall P. Myers

[57] ABSTRACT

A gyro is gimbaled within a frame which is fixed within an aircraft. Roll indicia is responsive to the gyro for rotation within a display window on the frame about an axis parallel to the roll axis of the aircraft. A horizon indicating member is also responsive to the gyro for movement within the display window to remain parallel to the actual horizon during flight of the aircraft. A steering bar is movable within the display window relative to the roll indicia and the horizon indicating member in dependence upon selected flight guidance commands.

8 Claims, 9 Drawing Figures

AIRCRAFT HORIZON DISPLAY AND STEERING INDICATOR

RELATED APPLICATION

This application is a continuation of application Ser. No. 855,984, filed Sept. 8, 1969, now abandoned.

FIELD OF THE INVENTION

This invention relates to an aircraft instrument display and more particularly to a display for illustrating the attitude of an aircraft in combination with pitch and roll steering information.

THE PRIOR ART

Gyro-driven horizon reference indicators have heretofore been available for aircraft to provide visual indication of the aircraft's pitch and roll attitude with respect to the earth. Such pitch and roll information is visually presented to the pilot by means of a panel display having a fixed index representing the aircraft's position. A horizon pointer disk is mounted behind the index and is movable in response to a gyro in order to remain parallel to the true horizon regardless of the aircraft's attitude. A circular dial ring is also provided in the display to visually indicate angular movements of the aircraft in roll with respect to graduated degree markings. Such previous reference indicators have additionally generated autopilot command signals by monitoring changes in position of the gyro gimbal. Examples of such horizon reference indicators are the Model 52D66 and 52D67 Indicators manufactured and sold by Mitchell Industries, Inc., of Mineral Wells, Texas.

Further, flight display systems have been heretofore developed wherein flight command information is displayed along with artificial horizon indications. Such a system is described in U.S. Pat. No. 3,162,834 issued Dec. 22, 1964 to Schweighofer et al. Another example of such a flight command system is the Flight Director FD-109G System manufactured and sold by Collins Radio Company of Cedar Rapids, Iowa. Such previous systems have, however, required a large number of servomotors and servo amplifiers which increased the complexity, cost and size of the systems.

SUMMARY OF THE INVENTION

In accordance with the present invention, a display adapted to be fixed within an aircraft includes movable indicators for visually illustrating the pitch and roll of the aircraft. A steering indication member is movable within the display relative to the indicators in order to visually provide steering commands to the pilot.

In accordance with another aspect of the invention, a gyro is gimbaled within a frame fixed relative to an aircraft. A marked roll indicia is responsive to the gyro to rotate relative to the frame about an axis parallel to the roll axis of the aricraft. A horizon indicating member is responsive to the gyro for movement relative to the frame in order to remain generally parallel to the actual horizon during flight of the aircraft. A steering bar is movable relative to the frame in dependence upon selected flight pattern commands.

In accordance with a more specific aspect of the invention, a steering bar is mounted for movement relative to index members movable in the roll and pitch planes of an aircraft. Arms supporting the steering bar are mounted on a mounting block, the mounting block being pivoted on a yoke. The yoke is pivotable about an axis parallel to the length of the arms. Permanent magnets mounted on the mounting block are responsive to magnetic fields generated by first adnd second coils each responsive to a different steering signal in order to move the steering bar.

THE DRAWINGS

For a more complete understanding of the present invention and for further objects and advantages thereof, reference is now made to the following description taken in conjunction with the accompanying drawings, in which.

THE PREFERRED EMBODIMENT

Figure 1:
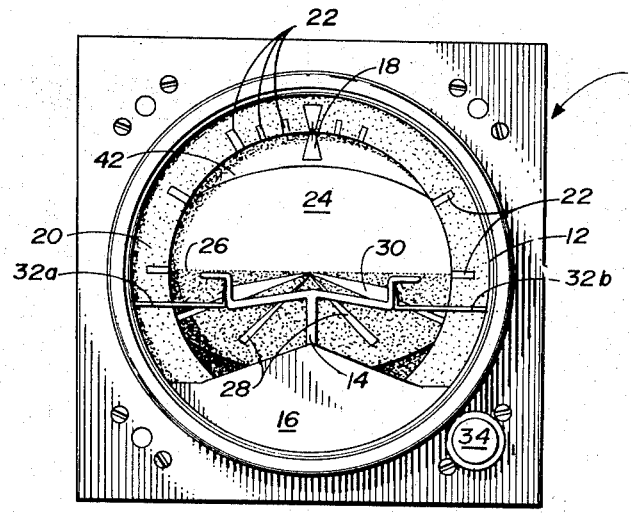
FIG. 1 is a front view of the present display.

Referring to FIG. 1, the front of the present steering indicator is shown. The display is mounted in a frame 10 which is adapted to be rigidly mounted in the instrument panel of the aircraft. Movable indicators of the display are set in a circular cutout window 12 in the front of the frame 10 and are generally of contrasting colors for ease of visibility. A reference index 14 is adjustably mounted on a support 16 to represent the position of the aircraft with respect to the various movable indicators of the display.

An indicia pointer 18 is rigidly connected to the frame 10 and is used as a reference point with respect to the roll of the aircraft. A marked roll indicia, or dial ring, 20 is rotatable within the display about the roll axis of the aircraft for visually indicating the roll attitude of the aircraft. The dial ring 20 includes various indicia 22 which are calibrated with respect to various standard bank angles. A horizon indicating member 24 occupies the centermost portion of the display and includes a horizon line 26 embossed or otherwise imprinted thereon. The horizon indicating member 24 also includes various radially extending indicia 28 thereon to assist in locating the position of the aircraft with respect to the actual horizon. Member 24 has a curved cross section and is movable in both the pitch and roll axis of the aircraft in order to remain parallel to the actual horizon regardless of the attitude of the aircraft.

A steering bar 30 is disposed for movement across the display in order to provide visual indication of steering commands from a flight director computer or the like. The steering bar 28 comprises an inverted V-shaped member and is connected at each end to small connecting bars 32a and b. A calibration knob 34 is provided to enable small adjustments to be made in the height of the reference index 14 in order to calibrate the dial in accordance with the pilot's height. This height adjustment is accomplished by a gearing mechanism (not showm) within the support 16.

Figure 2:
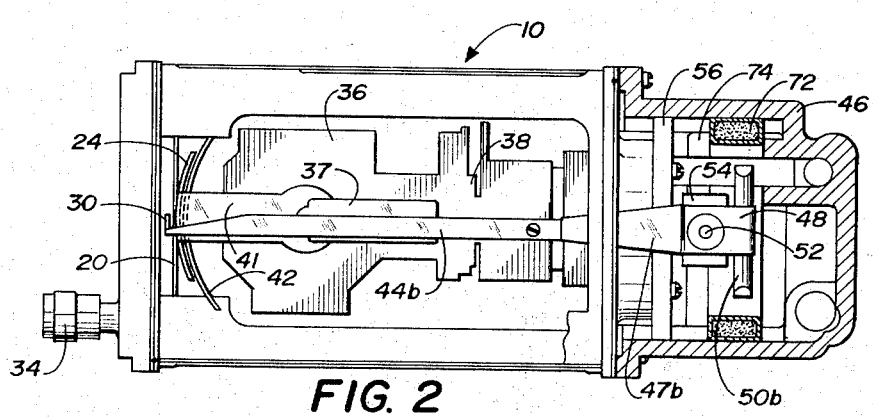
FIG. 2 is a side view, partially in cross section, of the display shown in FIG. 1.

FIG. 2 illustrates a side view, partially sectioned, of the display. A gyro 36 is gimbaled within the frame 10 in a manner to be subsequently described in order to serve as a positional reference. Gyro 36 is an accurately balanced, high-speed air driven motor which is mounted on precision bearings inside an enclosed rotor housing. The rotor housing is suspended from bearings mounted to a gimbal assembly 37 and is free to pivot in the vertical plane up to ±85° in pitch. The gimbal assembly 37 is suspended from bearings in the rear housing such that the gyro has complete freedom of movement about the roll axis of the aircraft.

A vacuum system, not shown, draws air from the rear of the frame 10 at normal atmospheric pressure into the gyro 36 and directs the air against the rotor periphery of the gyro to thereby cause to rotor to revolve at high speed. The air is exhausted through jets (not shown) at the rear of the rotor housing. The gyro 36 thus serves as a reference with respect to changes in the attitude of the aircraft in the well-known manner.

A suitable air driven gyro of the type described is utilized in the MOdel 52D66 and 52D67 Horizon Reference Indicators manufactured and sold by Mitchell Industries, Inc., of Mineral Wells, Texas. However, other types of gyros, such as magnetic field driven gyros may be utilized. An example of such a magnetic field driven gyro is described in U.S. Pat. No. 3,409,992 issued to Younkin on Nov. 12, 1968, and in U.S. Pat. No. 3,261,006, issued to Younkin on July 12, 1966. A roll pickoff 38 and apitch pickoff 39 (FIG. 4) are disposed adjacent the gimbal 37 in order to provide indications of the roll and pitch of the aircraft to the autopilot system in the well-known manner. The roll and pitch pickoffs are of the inductive type used on the Model 52D66 and 52D67 Indicators previously identified.

Figure 4:
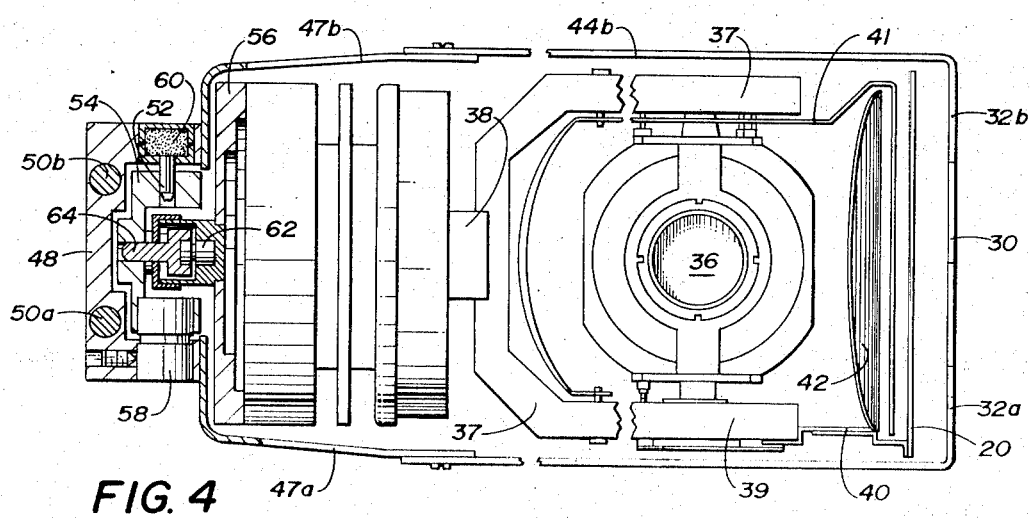
FIG. 4 is a top view, partially cross sectioned, of the steering bar mechanism and gyro unit of the invention.

As best shown in FIGS. 2 and 4, the dial ring 20 is mounted on an arm 40 from the gyro gimbal 37, for rotation about the roll axis of the aircraft. The horizon indicating member 24 is mounted behind the dial ring 20 and is connected by an arm 41 to the gimbal assembly 37. The arm 41 is connected to the gimbal assembly 37 for vertical movement of the member 24 in accordance with the pitch of the airplane. Additionally, the arm 41 is rotated with movement of the gyro in the roll plane to provide visual indication of the roll of the aircraft by rotating the horizon indicating member 24.

The horizon indicating member 24 has a curved cross section so as to appear generally elliptical from the front of the display, as shown in FIG. 1. A mask 42 having a similar curved cross section is disposed behond the horizon indicating member 24. The mask 42 is connected to the gyro assembly 37 by the arm 40 in order to rotate in the roll plane of the aircraft along with the dial ring 20 and the horizon indicating member 24. Mask 42 masks the interior components within the frame 10 as the horizon indicating member 24 moves across the display window.

The steering bar 30 of the invention is connected at both ends to the connecting bars 32a–b which are respectively connected to the ends of a pair of elongated arms 44a–b. Arms 44a–b extend along the sides of the gyro assembly to the rear of the frame 10, where they are connected to a movement control assembly mounted within a rear casing 46. Arms 44a–b are rigidly connected to extension members 47a–b which are rigidly attached to a mounting gimbal 48.

Figure 3:
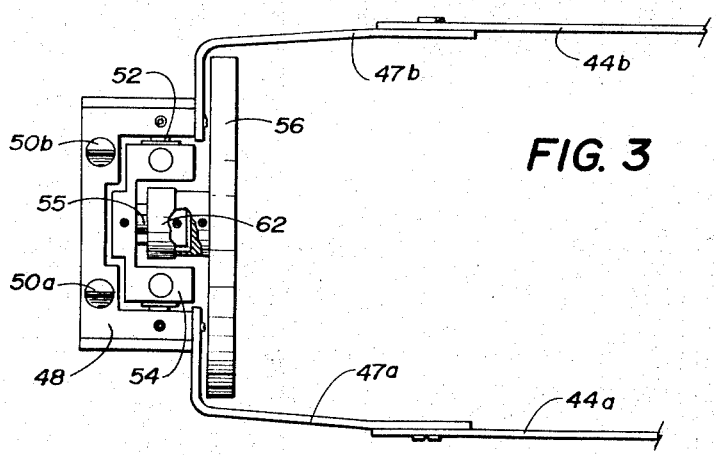
FIG. 3 is a top view, partially sectioned, of the steering arm unit of the invention.

The construction and operation of the movement control assembly for the arms 44a–b may be best understood by references to FIGS. 2–4. A pair of permanent bar magnets 50a–b are fixedly mounted in the gimbal 48. The gimbal 48 is mounted about a pivot axis 52 to a mounting block 54. Th block 54 is rotatably mounted about an axis 55 which is parallel to the length of the arms 44a–b and parallel to the roll axis of the aricraft. Block 54 is rotatably supported about axis 55 from a circular mounting base 56. As shown in FIGS. 2 and 4, base 56 is rigidly connected to the rear of the frame 10.

Gimbal 48 is thus pivotal about an axis perpendicular to the pivot axis 55 of the mounting block 54. Gimbal 48 is connected by a flexural pivot 58 to the mounting block 54, the flexural pivot tending to maintain the gimbal 48 in a normal position. A suitable flexural pivot is manufactured and sold as part No. 5012–800 by the Bendix Corporation. A pitch damper 60, including damping oil therein, is also disposed between the gimbal 48 and the block 54 in order to provide damping between the relative movement of the two members.

A flexural member 62 is disposed at the axis 55 between the base 56 and the block 54. As shown in FIG. 4, roll damper mechanism 64 is also disposed at the picot axis 55 of the block 54, and includes damping oil therein, in order to damp the movement of the block 54. The movement assembly for the arms 44a–b is thus movable in both the pitch and roll axis of the aircraft by rotation about the pivot axes 52 and 55.

Figure 5:
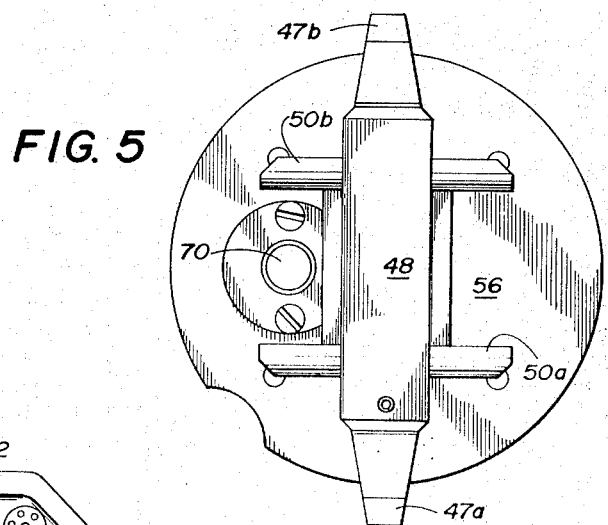
FIG. 5 is an end view of the steering arm mechanism shown in FIGS. 3 and 4.

The movement of the arms 44a–b is controlled by selective electrical energization of wound coils disposed adjacent the permanent magnets 50a–b. FIG. 5 shows an end view of the gimbal 48 illustrating the elongate shape and parallel disposition of the bar magnets 50a–b. A conduit 70 is provided for the air supply for energization of the gyro 36.

Figure 6:
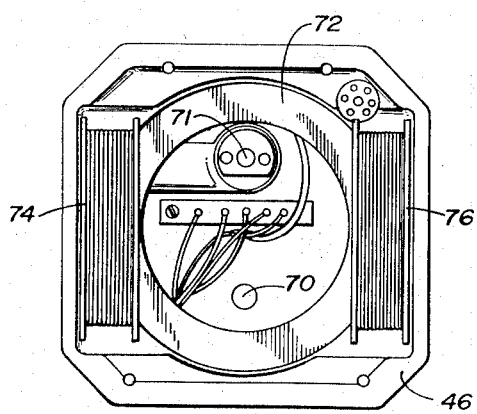
FIG. 6 is an end view of the coil housing of the present display.

FIGS. 2 and 6 illustrate the construction and relative positions of the wound coils which control the movement of the bar magnets 50a–d. A circular, centrally located coil 72 is mounted in the rear housing 46 about the magnets 50a–b. Coil 72 is energized by electrical pitch signals generated from a flight director computer in order to control the vertical movement of the steering bar 30. For instance, a positive DC voltage fed to coil 72 causes a magnetic field to be generated which interacts with the field of the permanent magnets 50a–b to pull the gimbal 48 downwardly to hereby raise the steering bar 30 to indicate a climb command. Conversely, a negative D. C. voltage supplied to coil 72 will cause the bar magnets 50a–b to be moved upwardly to pivot the arms 44a–b and the steering bar 30 downwardly to indicate a down pitch command to the pilot.

Coils 74 and 76 are located on opposite sides of the bar magnets 50a–b and are controlled by roll electrical signals generated by the flight director computer. For instance, a positive DC voltage applied across the terminals of the two coils 74 and 76 generates a magnetic field which opposes one bar magnet 50a and attracts and end of the opposite bar magnet 50b to cause the block 54 to pivot about the pivot axis 62. This causes rotation of the arms 44a–b about the roll axis of the aircraft to rotate the steering bar 30 to indicate a bank steering command. A negative DC voltage applied across the coils 74 and 76 will cause the steering bar 50 to indicate a bank command in the opposite direction. The magnitude of the DC voltage applied to the coil 72-76 controls the magnitude of the steering commands provided by the steering bar 30.

Conduits 70 and 71 extend through the end of the rear housing 46 for the gyro air supply. Suitable electrical connections are also made at the back of the rear housing 46 to provide output electrical signals to the autopilot in the conventional manner.

In operation of the present unit, the display provides the pilot with visual indications of the position of the aircraft with respect to the actual horizon and also provides the pilot with degree indications of the airplane bank. The selected flight commands are indicated with respect to the steering bar 30. Such steering command signals are supplied by a suitable flight computer which provides programmed flight turns and other maneuvers. A disclosure of a suitable flight computer is found in th copending patent application Ser. No. 70,250, filed Sept. 8, 1970. The pilot steers the airplane toward the flight command illustrated by the steering bar 30 by lining up the reference index 14 with the steering bar 30. Once aligned, the airplane is at the proper attitude for performance of the desired preselected maneuver.

Figure 7:
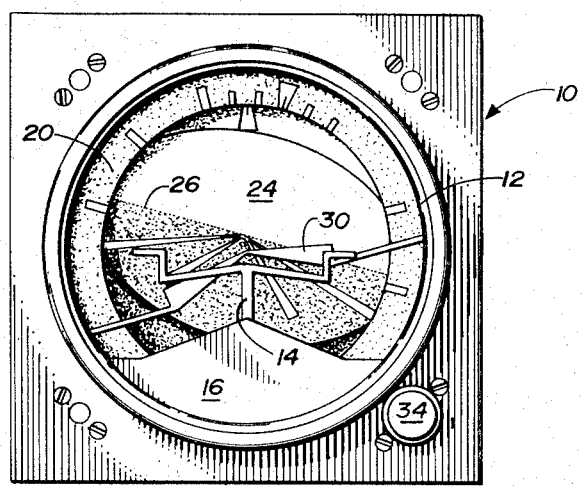
FIGS. 7–9 are front views of the present display illustrating various aircraft attitudes and steering commands.
Figure 8:
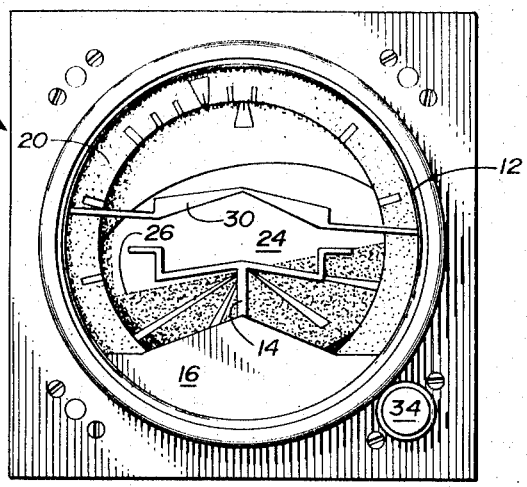
Figure 9:
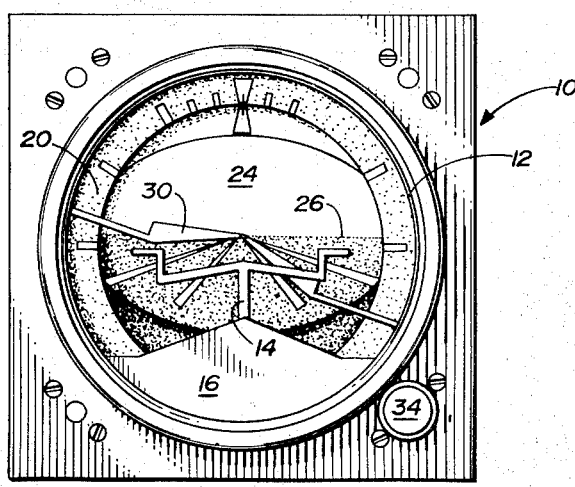

FIGS. 7–9 illustrate various relative positions of the indicia of the display to illustrate the operation of the invention. FIG. 7 illustrates the present display wherein the aircraft is banked left and a steering command of additional bank left is indicated. FIG. 8 illustrates a condition of right bank and nose up of the aircraft, with a steering climb command being provided by the steering bar 30. FIG. 9 illustrates generally level flight of the aircraft, with a bank right command being indicated by the steering bar 30.

Whereas the present invention has been described with respect to specific embodiments thereof, it is to be understood that various changes and modifications may be suggested to one skilled in the art, and it is intended to encompass these changes and modifications as fall within the scope of the appended claims.

What is claimed is:

1. In a steering indicator unit for the instrument panel of an aircraft wherein a gyro-driven artifical horizon is movable within the steering indicator unit and cooperates with a steering indication member movable within the unit relative to the horizon and a fixed aircraft reference index in response to pitch and roll steering command signals generated from a flight guidance system, the combination which comprises:
   a. an arm disposed within said unit and supporting said steering indication member at one end thereof,
   b. signal means within said unit forming a support for said arm at the end thereof opposite said steering indication member for rotational movement of said arm about axes parallel to the roll and pitch axes of said aircraft,
   c. permanent magnet means mounted with said arm on said gimbal means, and
   d. coil means fixed to said unit and responsive to pitch and roll steering signals for establishing magnetic fields which react with said magnets to rotate said arm in pitch and roll directions in dependance upon the summation of said fields to position said member relative to said horizon and said reference index.

2. The combination set forth in claim 1 wherein said magnet means comprises a bar magnet mounted with the length thereof parallel to the yaw axis of said aircraft and said coil means comprises at least one coil whose axis is parallel to said roll axis and at least one coil whose axis is parallel to said pitch axis.

3. The combination of claim 1 and further comprising:
   flexural means in said gimbal means for normally biasing said steering indication member in a central position in said display.

4. In a steering indicator unit for the instrument panel of an aircraft wherein a gyro gimbaled within a frame fixed relative to the aircraft operates an artificial horizon within the unit in cooperation with a remotely controlled steering indication member movable relative to a fixed reference index in the unit in response to pitch and roll steering command signals generated by a flight guidance system, the combination which comprises:
   a. a pair of spaced apart arms supporting said steering indication member at the ends thereof,
   b. a mounting gimbal forming a support for said arms at the end thereof opposite said steering indication member,
   c. a block having a first flexural pivot mounted on an axis parallel to the roll axis of said aricraft,
   d. a second flexural pivot perpendicular to said first pivot for supporting said mounting gimbal on said block,
   e. permanent magnet means mounted on aid mounting gimbal,
   f. first coil means responsive to a roll steering signal for establishing magnetic fields which react with said magnet means to rotate said steering indication member, and
   g. second coil means responsive to a pitch steering signal for establishing magnetic fields which react with aid magnet means for raising or lowering said steering indication member.

5. The combination defined in claim 4 wherein said permanent magnet means comprises:
   a pair of elongated magnetic bars disposed parallel to one another in said mounting gimbal in a vertical direction.

6. The combination defined in claim 4 wherein said arms extend from said mounting gimbal around said gyro to said steering indication member.

7. The combination defined in claim 4 wherein said steering indication member has a generally V-shaped configuration and is connected at each end to said arms.

8. The combination defined in claim 4 and further comprising:
   means for generating electrical signals representative of the position of said gyro.

* * * * *

PO-1050
(5/69)

UNITED STATES PATENT OFFICE
CERTIFICATE OF CORRECTION

Patent No. 3,792,427      Dated Feb. 12, 1974

Inventor(s) James R. Younkin

It is certified that error appears in the above-identified patent and that said Letters Patent are hereby corrected as shown below:

Col. 2, line 4, "adnd" should be --and--.
Col. 3, line 2, "showm" should be --shown--;
       line 31, "Youkin" should be --Younkin--;
       line 33, "apitch" should be --a pitch--;
       line 53, "behond" should be --behind--.
Col. 4, lines 10 and 11, "aricraft" should be --aircraft--;
       line 28, "picot" should be --pivot--;
       line 50, "hereby" should be --thereby--.
Col. 5, line 52, "signal" should be --gimbal--.

line 34, "aid" should be --said--;
       line 43, "aid" should be --said--.

Signed and sealed this 19th day of November 1974.

(SEAL)
Attest:

McCOY M. GIBSON JR.
Attesting Officer

C. MARSHALL DANN
Commissioner of Patents